United States Patent
Sakaki et al.

(10) Patent No.: US 6,822,761 B2
(45) Date of Patent: Nov. 23, 2004

(54) IMAGE PROCESSING APPARATUS AND METHOD AND STORAGE MEDIUM

(75) Inventors: Eihiro Sakaki, Sunto-gun (JP); Hiroyuki Yamazaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 359 days.

(21) Appl. No.: 10/135,513

(22) Filed: May 1, 2002

(65) Prior Publication Data

US 2002/0126316 A1 Sep. 12, 2002

Related U.S. Application Data

(62) Division of application No. 09/721,698, filed on Nov. 27, 2000, now Pat. No. 6,411,402.

(30) Foreign Application Priority Data

Jul. 15, 1997 (JP) .............................................. 9-189743
Jul. 15, 1997 (JP) .............................................. 9-189744

(51) Int. Cl.[7] .......................................... H04N 1/387
(52) U.S. Cl. .................... 358/1.9; 358/450; 358/520; 358/901
(58) Field of Search ................................ 358/448, 450, 358/1.9, 443, 540; 399/1, 6, 366; 283/901

(56) References Cited

U.S. PATENT DOCUMENTS

| | | | |
|---|---|---|---|
| 5,436,974 A | 7/1995 | Kovanen | 283/901 |
| 5,541,741 A | 7/1996 | Suzuki | 358/450 |
| 5,568,550 A | 10/1996 | Ur | 382/306 |
| 5,748,783 A | 5/1998 | Rhoads | 283/901 |
| 5,790,932 A | 8/1998 | Komaki et al. | 399/366 |
| 5,822,660 A | 10/1998 | Wen | 358/450 |
| 5,901,224 A | 5/1999 | Hecht | 399/366 |
| 5,904,375 A | 5/1999 | Brugada | 283/901 |
| 5,982,956 A | 11/1999 | Lahmi | 382/306 |
| 6,050,606 A | 4/2000 | Foresti | 283/901 |
| 6,095,425 A | 8/2000 | Mowry, Jr. | 283/901 |

FOREIGN PATENT DOCUMENTS

| | | |
|---|---|---|
| EP | 0 493 053 | 7/1992 |
| EP | 0 581 317 | 2/1994 |
| EP | 0 593 360 | 4/1994 |
| EP | 0 651 554 | 5/1995 |

*Primary Examiner*—Thomas D. Lee
(74) *Attorney, Agent, or Firm*—Fitzpatrick, Cella, Harper & Scinto

(57) ABSTRACT

It is an object to provide an adding technique for enabling additional information to be certainly decoded from an image to which two or more kinds of additional information was added to an input image so that it is difficult to discriminate by the human eyes. To accomplish this object, for example, a plurality of kinds of additional information is periodically added to the input image at different periods so that it is difficult to discriminate by the human eyes. The image to which those additional information was added is outputted to an image forming unit.

10 Claims, 17 Drawing Sheets

|  | b7 | b6 | b5 | b4 | b3 | b2 | b1 | b0 |
|---|---|---|---|---|---|---|---|---|
| F000 | ///// TRACKING PATTERN DATA 0 ///// |||||||| |
| F001 | ///// TRACKING PA ///// | TERN DATA 1 |||||||
| F002 | TRACKING PATTERN DATA 2 |||||||| |
| F003 | TRACKING PATTERN DATA 3 |||||||| |
| F004 | TRACKING PATTERN DATA 4 |||||||| |
| F005 | TRACKING PATTERN DATA 5 |||||||| |

FIG. 13

| | b7 | b6 | b5 | b4 | b3 | b2 | b1 | b0 |
|---|---|---|---|---|---|---|---|---|
| F000 | TRACKING PATTERN DATA 0 ||||||||
| F001 | TRACKING PATTERN DATA 1 ||||||||
| F002 | TRACKING PATTERN DATA 2 ||||||||
| F003 | TRACKING PATTERN DATA 3 ||||||||
| F004 | TRACKING PATTERN DATA 4 ||||||||
| F005 | TRACKING PATTERN DATA 5 ||||||||
| F006 | TRACKING PATTERN DATA 6 ||||||||
| F007 | TRACKING PATTERN DATA 7 ||||||||
| F008 | TRACKING PATTERN DATA 8 ||||||||
| F009 | TRACKING PATTERN DATA 9 ||||||||
| F00A | TRACKING PATTERN DATA A ||||||||

FIG. 16

| | CODE | BINARIZED CODE | |
|---|---|---|---|
| PHASE DIFFERENCE BETWEEN ADDON LINE 15 AND ADDON LINE 0 | 2 | 0,1,0 | ← (a02,a01,a00) |
| PHASE DIFFERENCE BETWEEN ADDON LINE 0 AND ADDON LINE 1 | 4 | 1,0,0 | ← (a12,a11,a10) |
| PHASE DIFFERENCE BETWEEN ADDON LINE 1 AND ADDON LINE 2 | 0 | 0,0,0 | ← (a22,a21,a20) |
| PHASE DIFFERENCE BETWEEN ADDON LINE 2 AND ADDON LINE 3 | 0 | 0,0,0 | ← (a32,a31,a30) |
| PHASE DIFFERENCE BETWEEN ADDON LINE 3 AND ADDON LINE 4 | 2 | 0,1,0 | ← (b02,b01,b00) |
| PHASE DIFFERENCE BETWEEN ADDON LINE 4 AND ADDON LINE 5 | 4 | 1,0,0 | ← (b12,b11,b10) |
| PHASE DIFFERENCE BETWEEN ADDON LINE 5 AND ADDON LINE 6 | 4 | 1,0,0 | ← (b22,b21,b20) |
| PHASE DIFFERENCE BETWEEN ADDON LINE 6 AND ADDON LINE 7 | 0 | 0,0,0 | ← (b32,b31,b30) |
| PHASE DIFFERENCE BETWEEN ADDON LINE 7 AND ADDON LINE 8 | 0 | 0,0,0 | ← (b42,b41,b40) |
| PHASE DIFFERENCE BETWEEN ADDON LINE 8 AND ADDON LINE 9 | 0 | 0,0,0 | ← (b52,b51,b50) |
| PHASE DIFFERENCE BETWEEN ADDON LINE 9 AND ADDON LINE 10 | 0 | 0,0,0 | ← (b62,b61,b60) |
| PHASE DIFFERENCE BETWEEN ADDON LINE 10 AND ADDON LINE 11 | 0 | 0,0,0 | ← (b72,b71,b70) |
| PHASE DIFFERENCE BETWEEN ADDON LINE 11 AND ADDON LINE 12 | 4 | 1,0,0 | ← (b82,b81,b80) |
| PHASE DIFFERENCE BETWEEN ADDON LINE 12 AND ADDON LINE 13 | 4 | 1,0,0 | ← (b92,b91,b90) |
| PHASE DIFFERENCE BETWEEN ADDON LINE 13 AND ADDON LINE 14 | 1 | 0,0,1 | ← (b102,b101,b100) |
| PHASE DIFFERENCE BETWEEN ADDON LINE 14 AND ADDON LINE 15 | 0 | 0,0,0 | ← (b112,b111,b110) |

IMAGE PROCESSING APPARATUS AND METHOD AND STORAGE MEDIUM

This application is a divisional of application Ser. No. 09/721,698, filed Nov. 27, 2000 now U.S. Pat. No. 6,411,402.

BACKGROUND OF THE INVENTION

1. Field of the Invention

The invention relates to image processing apparatus and method having a function to add additional information to an input image and relates to a storage medium in which such a method has been stored.

2. Related Background Art

In recent years, the performance of an image processing apparatus such as color printer, color copying apparatus, or the like has been improved and an image of a high picture quality can be provided. Thus, an image can be being formed with a picture quality almost similar to that of a bill, securities, or the like.

However, the formation of such an image is inhibited and it is necessary to suppress such illegal behavior. As one of countermeasures for this purpose, there has been known a technique to bury a dot pattern showing the numbers (information such as manufacturing number, product number, user ID, and the like) which are peculiar to the image processing apparatus into each image to be formed. By performing such a process, even if an image is illegally formed, by analyzing the dot pattern buried in the formed image, various situations at a time when the image is formed can be also known.

The dot pattern is periodically buried into the whole image every predetermined periods. Therefore, even if only a part of the image exists, since the information has been buried in this partial portion, the search of the various information as mentioned above can be executed.

To perfectly search the various information, an area of the partial portion in the image needs to be set to an area corresponding to at least one period among the above periods.

A conventional adding method of the dot pattern (additional information) as mentioned above differs every manufacturer who manufactures each of the image processing apparatus. To decode the additional information such as a manufacturing number and the like on the basis of a certain formed image, it is necessary to sequentially use a decoding method corresponding to the adding method of each manufacturer.

However, hitherto, there is a problem such that the additional information (manufacturing number, product number, user ID, and the like) added to the image which is finally formed cannot be decoded at all due to a cause such that the image process of the input image has some periodic trouble, the original image contents are periodic, or the like.

Particularly, the problem as mentioned above is likely to occur in the case where an area of the formed image is small like a stamp or the like rather than the case where an area of the formed image is large like a bill or the like.

Hitherto, in the case where the number of manufacturers who manufacture the apparatuses is large, there is a problem such that a load to sequentially use the decoding methods as mentioned above is large. In particular, such a problem typically appears in case of performing the above decoding by a software process or the like.

SUMMARY OF THE INVENTION

The invention is made in consideration of the foregoing conventional technique and it is an object to provide an adding technique for enabling additional information to be certainly decoded from an image obtained by adding two or more kinds of additional information has been added to an input image so that it is difficult to discriminate by the human eyes.

For example, it is an object of the invention to enable information having a high significance to be decoded as much as possible in case of burying two or more kinds of additional information into an input image.

To accomplish the above objects, according to one preferred embodiment of the invention, there is provided an image processing apparatus comprising:

adding means for periodically adding first additional information to an input image by a first period so that it is difficult to discriminate by the human eyes and for periodically adding second additional information different from the first additional information by a second period different from the first period so that it is difficult to discriminate by the human eyes; and output means for outputting the image to which predetermined additional information was added by the adding means to an image forming unit.

According to another embodiment, there is provided an image processing apparatus comprising:

adding means for adding information consisting of first additional information and second additional information to an input image every unit area which is periodically assigned;

switching means for switching a positional relation between an area showing the first additional information and an area showing the second additional information in the unit area; and output means for outputting the image to which predetermined additional information was added by the adding means to an image forming unit.

According to still another embodiment, there is provided an image processing apparatus comprising:

adding means for adding first additional information to an input image by a first method so that it is difficult to discriminate by the human eyes and for adding second additional information by a second method so that it is difficult to discriminate by the human eyes; and output means for outputting the image to which predetermined additional information was added by the adding means to an image forming unit, wherein the first additional information is information which can specify the second method.

According to further another embodiment, there is provided an image processing apparatus comprising:

adding means for adding first additional information including an error correction code having a first error correcting ability to an input image so that it is difficult to discriminate by the human eyes and for adding second additional information including an error correction code having a second error correcting ability different from the first error correcting ability so that it is difficult to discriminate by the human eyes; and output means for outputting the image to which predetermined additional information was added by the adding means to an image forming unit.

The above and other objects and features of the present invention will become apparent from the following detailed description and the appended claims with reference to the accompanying drawings.

BRIEF DESCRIPTION OF THE DRAWINGS

FIG. 13 is a diagram showing a state of a register to store a tracking code (additional information);

FIG. 16 is a diagram showing a code shown by each AddOn line;

DETAILED DESCRIPTION OF THE PREFERRED EMBODIMENTS

The first embodiment of the present invention will now be described hereinbelow.

Figure 3:
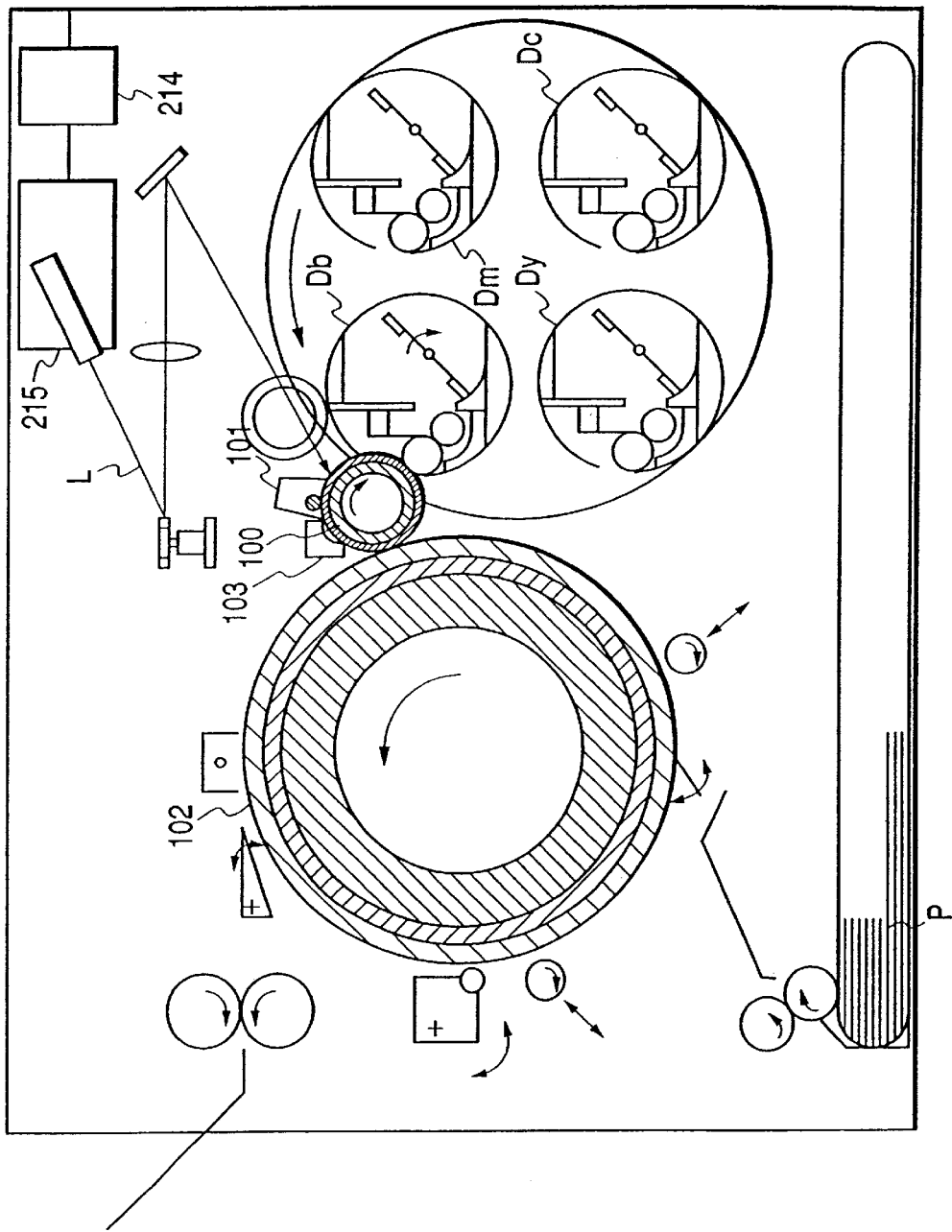
FIG. 3 is a diagram showing an example of an image processing apparatus.

FIG. 3 is a diagram showing an image processing apparatus using a color electrophotographing technique which is used in the embodiment. In the diagram, reference numeral 214 denotes a printer controller (hereinafter, referred to as a controller), which will be explained hereinlater. The controller receives image data of R, G, and B each consisting of eight bits per color inputted from a host computer serving as external equipment, executes well-known color image processes, and after that, outputs the processed image data to a printer engine at the post stage as image data of M (magenta), C (cyan), Y (yellow), and K (black) each consisting of 8 bits per color.

Reference numeral 215 denotes a printer engine (hereinafter, referred to as an engine), which will be explained hereinlater. The engine outputs the inputted color image data of MCYK as a laser beam L modulated on the basis of an image of each color.

A charging device 101 uniformly charges a photosensitive drum 100 to a predetermined polarity. For example, a first latent image is formed in magenta onto the photosensitive drum 100 by an exposure of the laser beam L.

In this case, a predetermined development bias voltage is subsequently applied to only a developing device Dm of magenta. A latent image of magenta is developed. A first toner image of magenta is formed on the photosensitive drum 100.

A transfer paper P is fed at a predetermined timing. Just before the front edge of the paper reaches a transfer start position, a transfer bias voltage (+1.8 kV) of a polarity (for example, plus polarity) opposite to the polarity of toner is applied to a transfer drum 102. The paper is electrostatically adsorbed onto the surface of the photosensitive drum 100. After that, the first toner image on the photosensitive drum 100 is transferred onto the transfer paper P and, at the same time, the transfer paper P is electrostatically adsorbed onto the surface of the transfer drum 102. Subsequently, the magenta toner remaining on the photosensitive drum 100 is removed by a cleaner 103, thereby preparing for the latent image formation and a developing step of the next color.

A second latent image of cyan is subsequently formed on the photosensitive drum 100 by the laser beam L. The second latent image on the photosensitive drum 100 is formed by a developing device Dc of cyan, so that a second toner image is formed. The second toner image of cyan is transferred onto the transfer paper P so as to be matched to the position of the first latent image of magenta which has already been transferred onto the transfer paper P. In the transfer of the toner image of the second color, a bias voltage of +2.1 kV is applied to the transfer drum 102 just before the transfer paper P reaches the transfer unit.

Similarly, third and fourth latent images of yellow and black are sequentially formed on the photosensitive drum 100 and are sequentially developed by developing devices Dy and Db, respectively. Third and fourth toner images of yellow and black are sequentially transferred so as to be matched to the position of the toner image which has already been transferred to the transfer paper P. Thus, the toner images of four colors are formed on the transfer paper P in an overlapped state.

Figure 4:
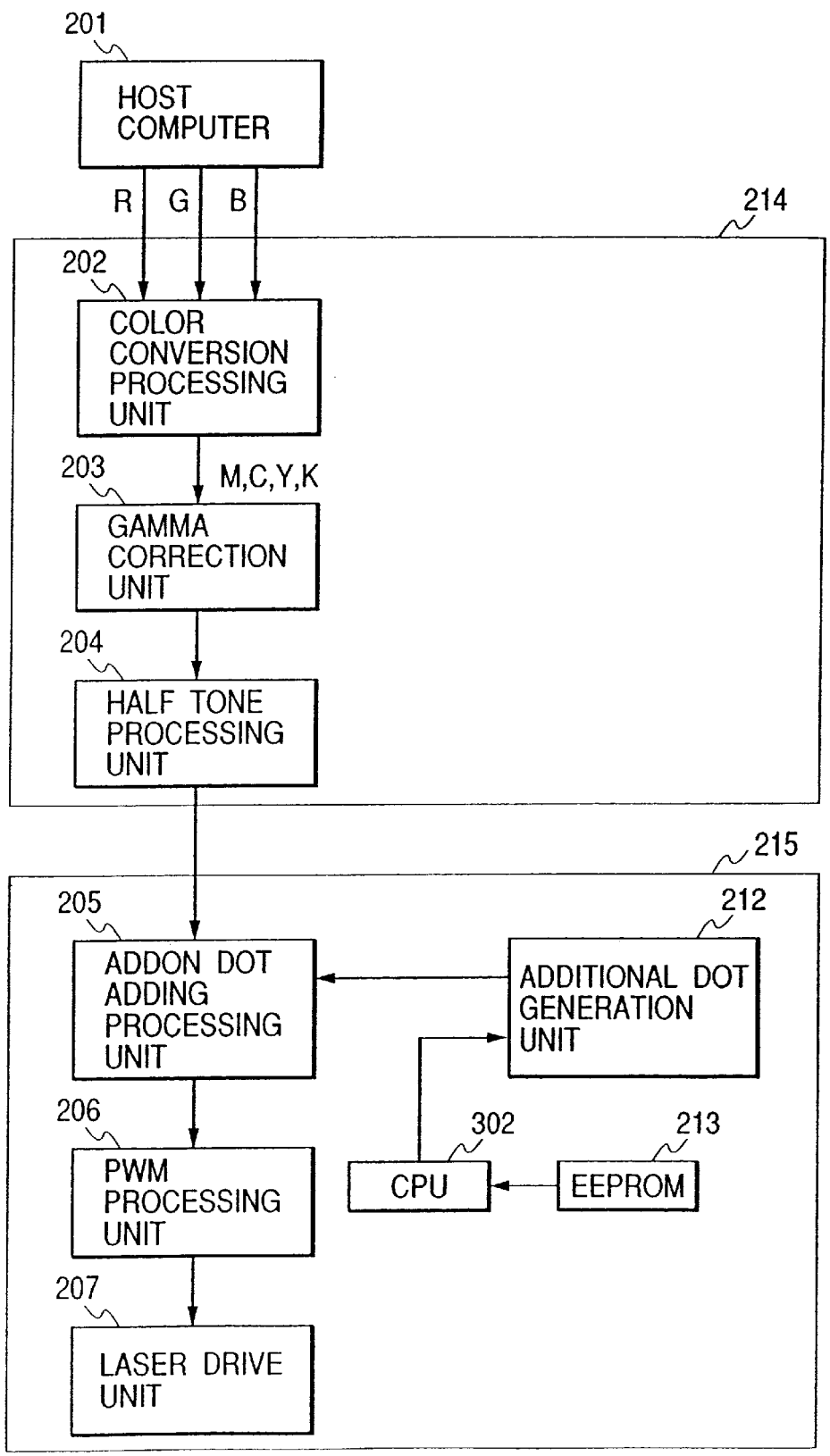
FIG. 4 is a diagram showing a procedure for image processes.

FIG. 4 is a block diagram showing an image processing procedure. Color image data of RGB is transmitted in parallel from a host computer 201 serving as external equipment and is inputted to the controller 214.

A color conversion processing unit 202, a γ (gamma) correction unit 203, and a half tone processing unit 204 are arranged in the controller 214. Processes such as masking and UCR are executed to the inputted RGB signals by the color conversion processing unit 202 and a color correction and an undercolor removal are executed, so that they are converted into image data of magenta (M), cyan (C), yellow (Y), and black (K). Since the image processing apparatus prints every picture plane of each color of Y, M, C, and K, the image data is area sequentially outputted from the color conversion processing unit 202, namely, in accordance with the order of the data of one picture plane of M, the data of one picture plane of C, the data of one picture plane of Y, and the data of one picture plane of K.

Subsequently, the image data is corrected by the γ correction unit so that an output density curve becomes linear. A half tone process is executed by the half tone processing unit 204 by a method such as systematic dither method, error diffusing method, or the like.

After the above processes were executed in the controller 214, the image data of M, C, Y, and K is area sequentially inputted to the engine 215.

The engine 215 is constructed by an AddOn adding processing unit 205, a PWM (Pulse Width Modulation) processing unit 206, a laser drive unit 207, an additional dot generation unit 212, an EEPROM 213, and the like.

The AddOn adding processing unit 205 buries enciphered information (dot pattern) as necessary into the image data of M, C, Y, and K inputted from the controller 214 in accordance with the signal which is inputted from the additional dot generation unit 212 and outputs the resultant image data to the PWM processing unit 206. In the embodiment, an AddOn pattern is added to only the image data of yellow (Y) which is inputted and the resultant image data is outputted. This is because a feature such that the image of yellow (Y) is difficult to be discriminated by the human eyes rather than the images of the other colors (M, C, K) is used.

After that, the image data is pulse width modulated by the PWM processing unit 206 and is D/A converted. After that, the converted analog signal is inputted to the laser drive unit 207 and is printed.

A CPU 302 is provided in the engine 215 and executes a control of each block in the engine and transmission and reception of data to/from the respective blocks.

Figure 5:
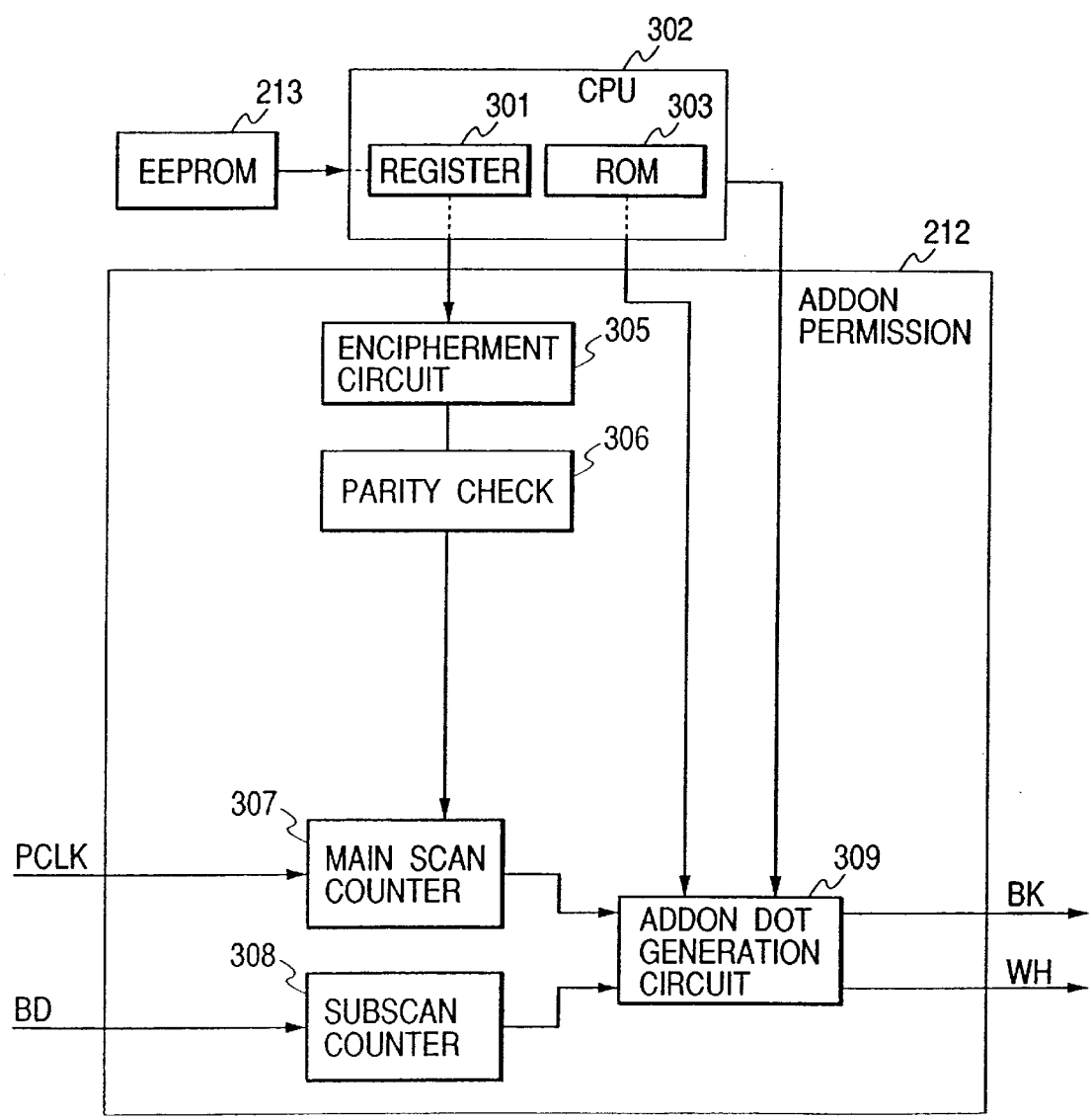
FIG. 5 is a detailed diagram of the basic additional dot generation unit 212.

FIG. 5 is a block diagram of the basic additional dot generation unit 212 to bury additional information into an image. Fake tracking codes (additional information) stored in the EEPROM 213 are loaded into a register 301 in the CPU 302 when the image processing apparatus is activated.

Figures 6, 7:
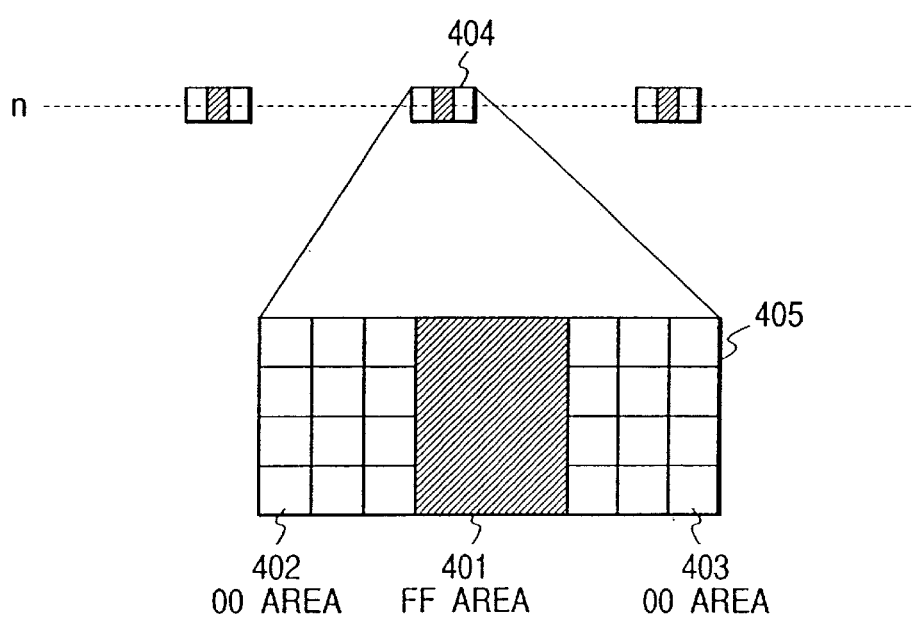
FIG. 6 is a diagram showing a state in a register.
FIG. 7 is a diagram showing an example of AddOn dots.

FIG. 6 shows an internal construction of the register 301. Codes are stored in addresses F000 to F005 in the register. Total twelve bits consisting of eight bits of the address F000 and upper four bits of the address F001 shown in hatched portions in the diagram correspond to an area to store a code of a manufacturer ID (ID of the manufacturer who manufactured the image processing apparatus, printer controller 214, or printer engine 215). Among them, 8 bits indicate the code of the actual manufacturer ID and remaining 4 bits are parity bits for parity check.

Codes of the factory ID of the manufacturer who manufactured the image processing apparatus, the apparatus number, the model number, and the like are stored in the other areas (lower four bits of the address F001 and the addresses of F002 to F005). The parity bits for parity check are also similarly added and stored in those registers.

When the image processing apparatus starts the printing operation, those values are enciphered by an encipherment circuit 305 and a parity is checked by a parity check 306. If there is an error here, the printing operation is stopped.

A main scan counter 307 transmits an ON signal at a position where AddOn dots should be added in accordance with a clock signal PCLK in the main scan direction of the image data. A subscan counter 308 performs a counting operation in response to a clock signal BD in the subscan direction and transmits an ON signal in an AddOn line. An AddOn dot generation circuit 309 receives an AddOn dot shape parameter which is stored in an ROM 303 of the CPU. The circuit 309 generates AddOn dots only when all of an AddOn permission signal which is turned on only when the yellow data is transmitted, the main scan counter 307, and the subscan counter 308 are ON. In an FF (the highest density) area, K is set to ON and in a 00 (the lowest density) area, WH (white) is set to ON, and they are transmitted. In the AddOn adding processing unit 205 in FIG. 4, when K is inputted, the image data at the position of the corresponding image is forcedly modulated to the highest density. When WH is inputted, it is modulated to the lowest density.

FIG. 7 is an example (enlarged diagram) of the AddOn dots. A broken line in the diagram shows an AddOn line (in the embodiment, it is assumed that one AddOn line has a thickness of four pixels) of the n-th line in the image. Reference numeral 404 denotes an AddOn dot and 405 indicates an enlarged dot of the AddOn dot. The AddOn dot is formed by an FF area 401 and 00 areas 402 and 403 located on both sides of the FF area 401. As mentioned above, the AddOn dot 404 is added to the AddOn line for a multi-value image (plane of yellow). As will be explained hereinlater, a phase difference between the AddOn dots can be used as various additional information.

Figure 8:
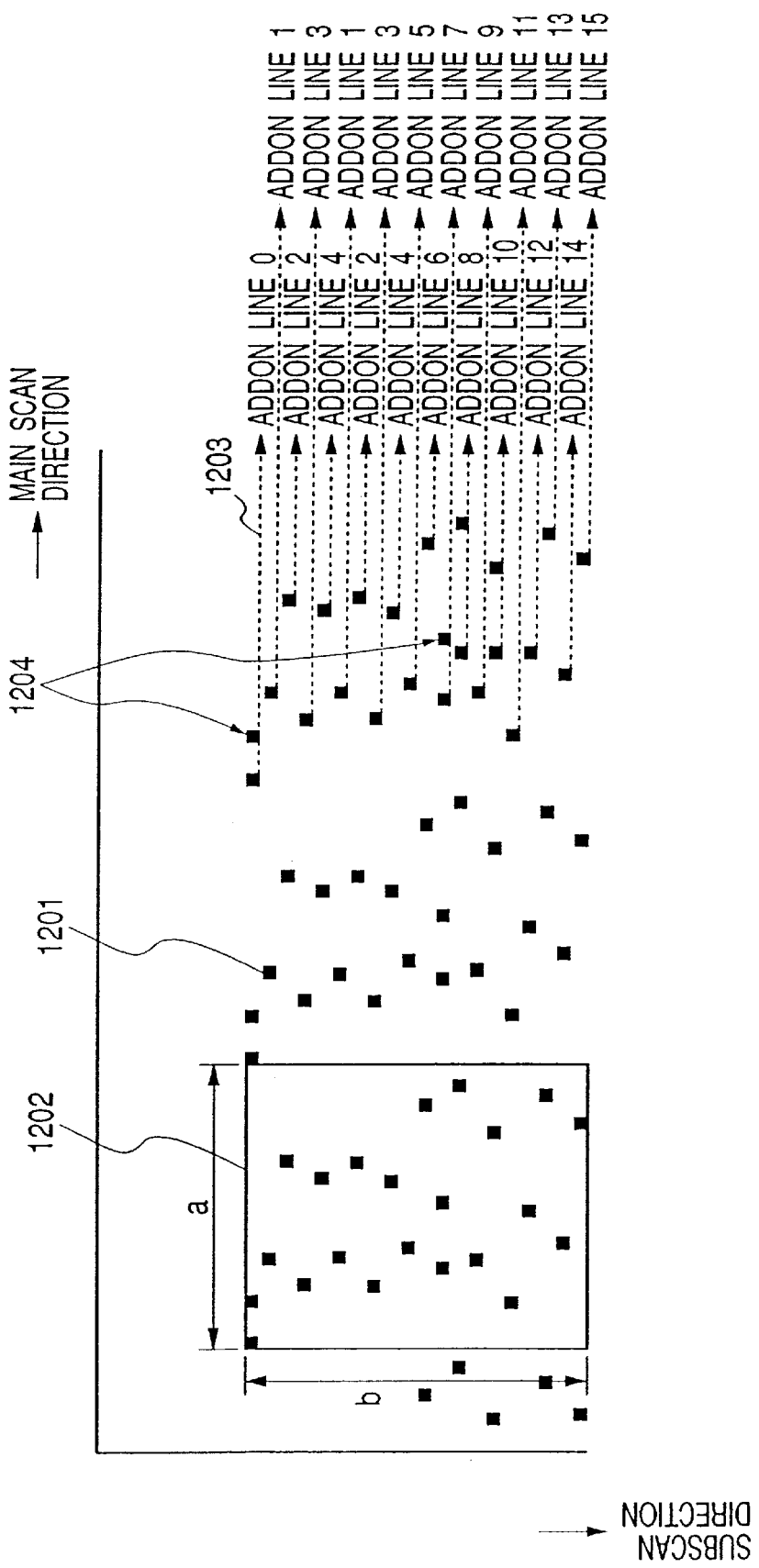
FIG. 8 is a diagram showing a state where the AddOn dots were added.

FIG. 8 shows a state of a formed image in the yellow plane derived by the addition of the basic additional information (AddOn dot) executed by the additional dot generation unit 212 in FIG. 5. Reference numeral 1201 corresponds to the AddOn dots 404 and 405.

An area 1202 shown by a×b denotes a size of image area which can express all of the additional information, namely, an image size of one period to add the additional information. All of the codes stored in the register in FIG. 6 can be expressed by the dots added in the area 1202.

A plurality of AddOn dots 1201 in the area 1202 are repetitively added to the whole image. In the present description, 16 lines 1203 called AddOn lines exist in the area of one period in the main scan direction. The AddOn dots 1201 are arranged one by one on each AddOn line.

By adding reference dots 1204 onto the zeroth and seventh AddOn lines, the start (head AddOn line) of one period and the direction of the AddOn line can be specified. The manufacturer ID and the other additional information (factory ID, apparatus number, model number, and the like) added by the additional dot generation unit 212 in FIG. 5 are always added at predetermined positions in the area 1202, respectively. Specifically speaking, four AddOn lines from the head correspond to the portion which always shows the manufacturer ID and the remaining AddOn lines correspond to the portion showing the other additional information.

Figure 9:
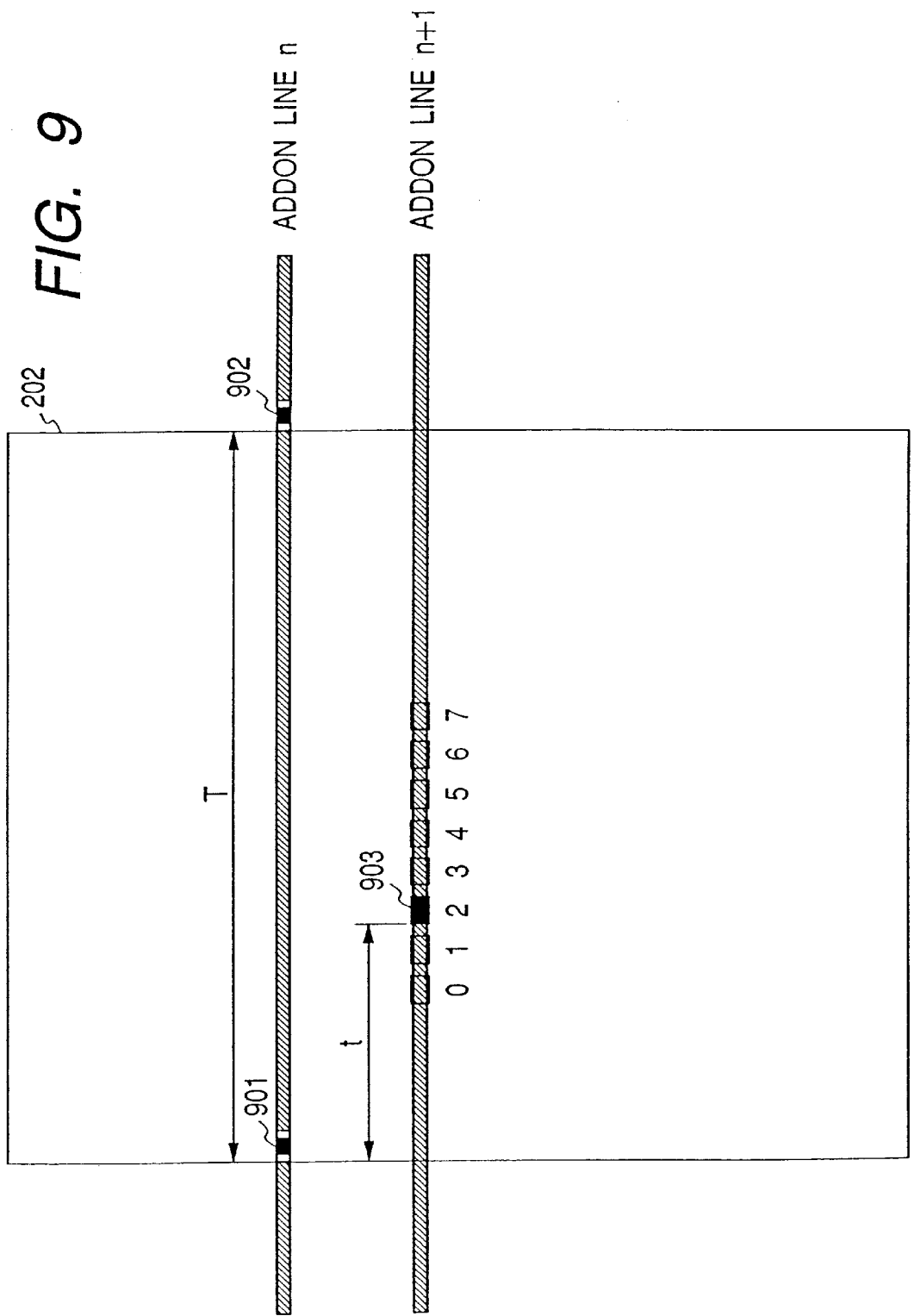
FIG. 9 is a diagram for explaining an adding method of an AddOn pattern.

How to show various codes (additional information) by a plurality of AddOn dots will now be described with reference to the drawings. FIG. 9 enlargedly shows the n-th and (n+1)th AddOn lines.

T denotes the repeating period of the AddOn pattern in the main scan direction. That is, AddOn dots 901 and 903 have similar roles and information is not shown by AddOn dots 901 and 902.

In the embodiment, it is assumed that information is expressed by a phase difference between the AddOn lines before and after the present line in the area 1202. By assigning phase differences like 0 to 7 in the diagram, information of three bits can be shown by each AddOn line. Since there are 16 AddOn lines in FIG. 8, information of 48 bits can be expressed and all of the codes stored in the register 301 can be added.

In FIG. 9, t denotes a phase difference between the AddOn dots 901 and 903 and shows 3-bit information of "2", namely, "010" in this case.

The basic construction when adding additional information to the input image has been described above. A characteristic construction of the embodiment will now be described hereinbelow.

In the embodiment, a construction of the foregoing additional dot generation unit 212, namely, a method of adding the manufacturer ID and the other information differs. The adding method will now be described in detail hereinbelow. Since the basic construction of the image processing apparatus shown in FIGS. 3 and 4 is similar to that mentioned above, its description is omitted.

Figure 1:
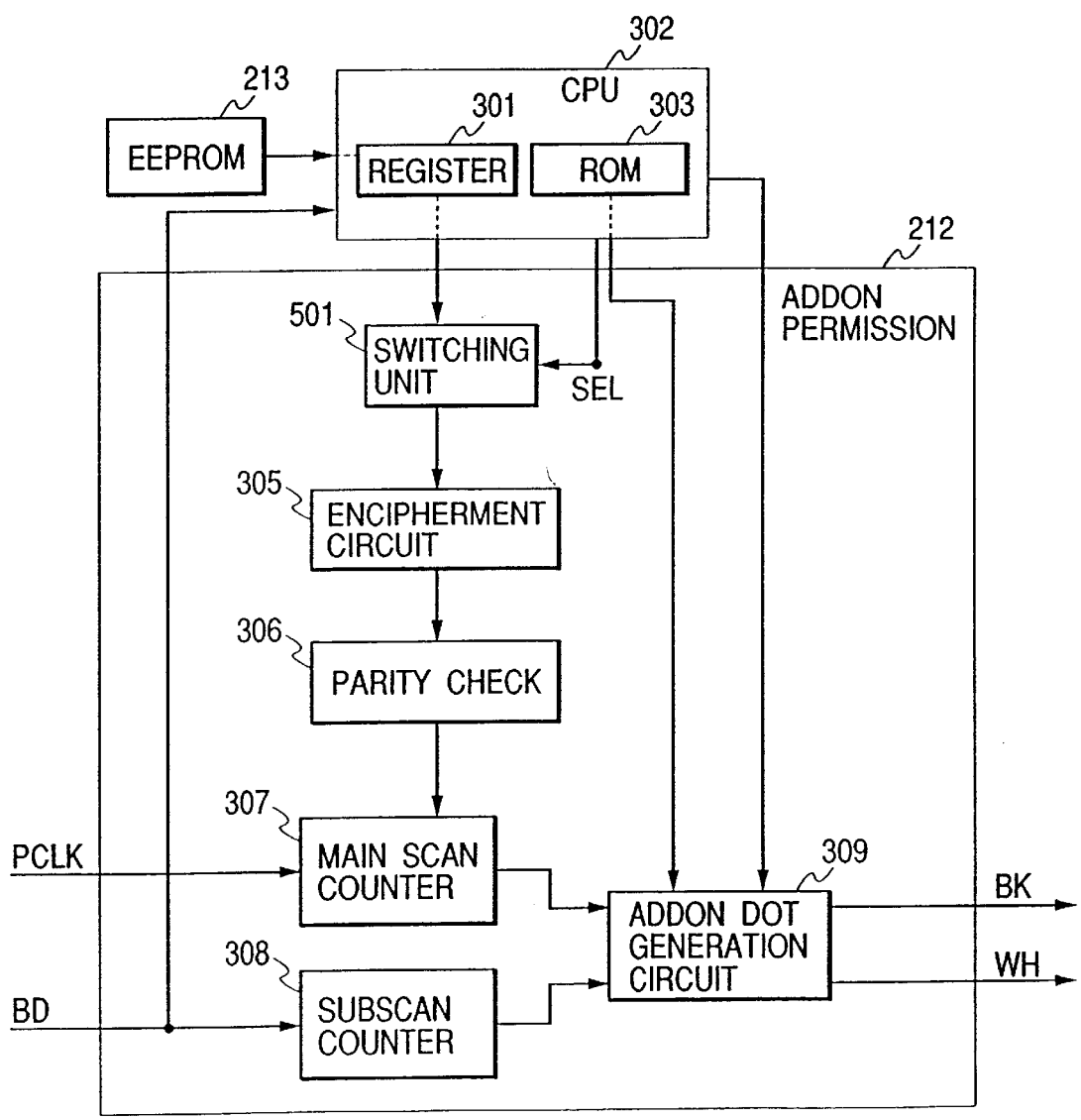
FIG. 1 is a detailed diagram of an additional dot generation unit 212.

FIG. 1 is a detailed diagram showing the additional dot generation unit 212, EEPROM 213, and CPU 302 in the embodiment. Component elements similar to those in FIG. 5 are designated by the same reference numerals and their descriptions are omitted.

The fake tracking codes (additional information) stored in the EEPROM 213 are loaded into the register 301 in the CPU 302 when the image processing apparatus is activated. Data which is loaded into the register 301 is data similar to that in FIG. 6.

Reference numerals 501 and 502 denote switching units for simultaneously performing the switching operations, which will be explained hereinlater, by the CPU 302 every predetermined AddOn line when the AddOn dots showing the manufacturer ID are formed and when the AddOn dots showing the other additional information are formed.

The CPU 302 has the switching unit 501 for counting the AddOn lines by counting the BD signal which is inputted and for switching so as to read out necessary codes every predetermined AddOn line on the basis of pattern information stored in the ROM. In the switching, a control signal SEL is generated from the CPU 302 for always counting the BD signal so that the addition of dots, which will be explained hereinlater, is executed.

Explanation will now be made hereinbelow with respect to a control such that all of the various additional information is not always added at fixed periods but important information (the manufacturer ID in the embodiment) in the plurality of additional information is added while changing the period.

First, when the image processing apparatus starts the printing operation, the control signal SEL to control so as to read out 12 bits (including the parity bits) showing the manufacturer ID in the register 301 is outputted from the CPU 302 to the switching unit.

Subsequently, the control signal SEL to control so as to read out the codes showing the other additional information (manufacturer ID, apparatus number, model number, and the like) as much as only predetermined AddOn lines is outputted from the CPU 302 to the switching unit.

For the above period of time, the CPU 302 always counts the AddOn lines. Therefore, for example, in case of sequentially adding the other additional information in accordance with the order of the manufacturer ID→apparatus number→model number, when reaching a predetermined number of AddOn lines at which the addition of the codes showing the manufacturer ID and the apparatus number is finished, the control signal SEL to control so as to read out the code showing the manufacturer ID is again outputted from the CPU 302 to the switching unit.

When the reading of the manufacturer ID is subsequently finished, the control signal SEL to control so as to read out the model number instead of the manufacturer ID and the apparatus number is outputted from the CPU 302 to the switching unit.

When the reading of the model number is finished, the control signal SEL to control so as to read out the code indicative of the manufacturer ID is again outputted from the CPU 302 to the switching unit.

By repeating the above processing steps, while the information of a relatively low significance is added one by one, two important information such as a manufacturer ID can be added.

In order to easily execute the foregoing control of AddOn lines, it is desirable that the AddOn lines corresponding to the codes showing the manufacturer ID, apparatus number, and model number are independent. However, even if such a construction is not used, it is possible to sufficiently execute. In this case, it is sufficient that the control signal SEL performs the read control on a unit basis of bits (3 bits in the embodiment) which can express one AddOn line instead of performing the read control every kind of additional information as mentioned above.

The code which was read out while performing the above control is enciphered by the encipherment circuit 305 in a manner similar to the encipherment circuit 305 in FIG. 5. A parity is checked by the parity check 306. If an error occurs here, the printing operation is stopped.

The subsequent process to add the AddOn dots is similar to that in FIG. 5.

Figure 2:
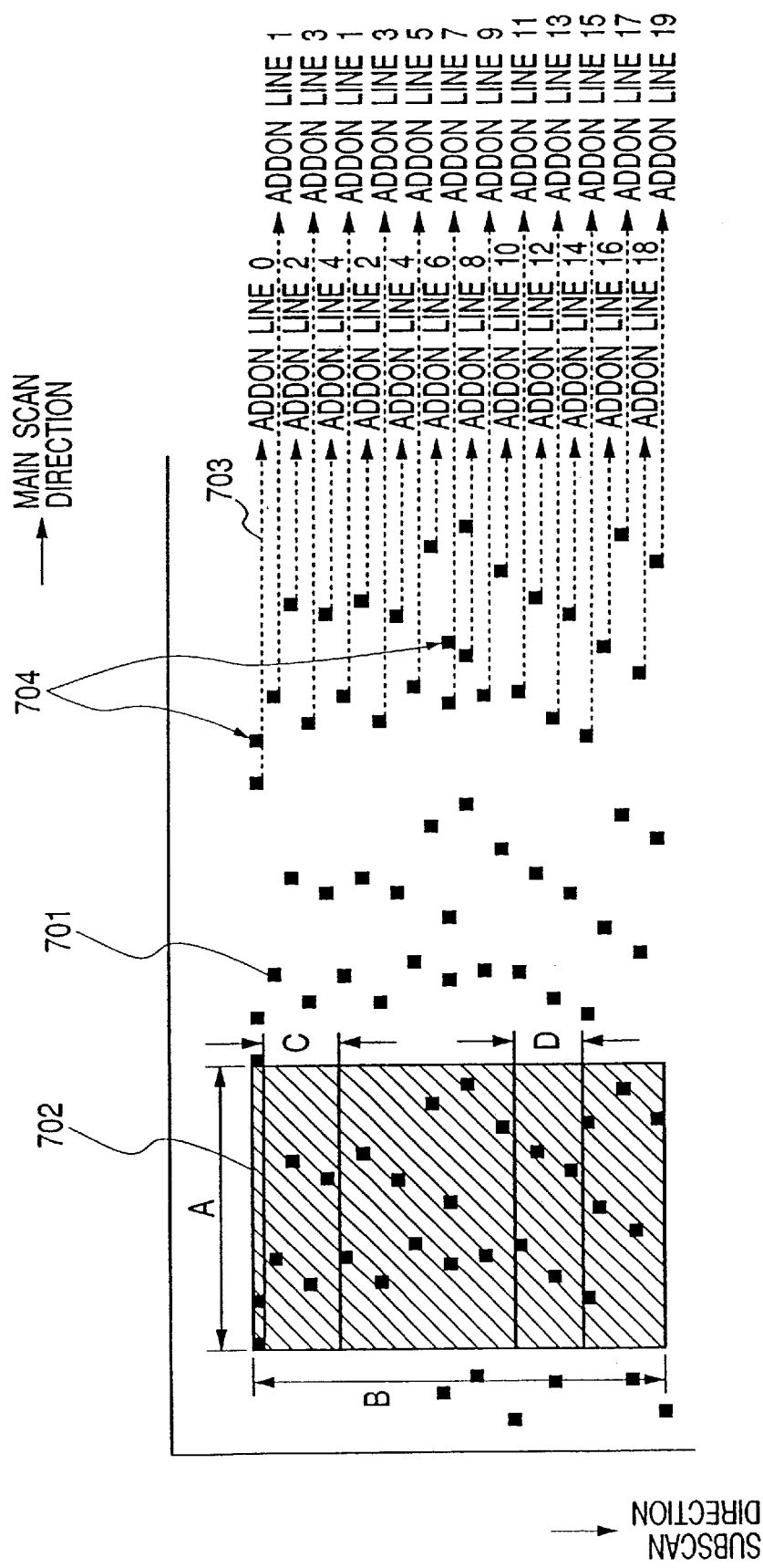
FIG. 2 is a diagram showing a state where AddOn dots were added.

FIG. 2 is a diagram showing a state when AddOn dots (additional information) is added by using the additional dot generation unit 212 in FIG. 1.

A meshed area 702 shown by A×B corresponds to the area 1202 in FIG. 8, namely, to an image area of a unit period which can show all of the information.

FIG. 2 differs from the case of FIG. 8 with respect to a point that the number of AddOn lines showing the manufacturer ID is doubled (8 lines). Therefore, the number of necessary AddOn lines is equal to 20.

Each dot 701 is the same as the AddOn dot in FIG. 8 and is shown in FIG. 7.

In the diagram, an area (for example, AddOn lines 1 to 4) shown by A×C and an area (for instance, AddOn lines 11 to 14) shown by A×D correspond to the AddOn lines indicative of the manufacturer ID.

In the embodiment, among a plurality of additional information which is added to the image, since the manufacturer ID is set to the information which needs the maximum decodability, it is controlled so that the manufacturer ID is added twice in a unit area (area 702).

Thus, even if there are causes of periodic elements such as in the case where a dot image similar to the dot 701 periodically exists in an image to which additional information should be added (in the case where the original image is an image such that a dot image always exists in the area of A×C at the same period as that in the area 702), in the case where there is always a trouble or the like of the image process in the area of A×C at the same period as that of the area 702, or the like, since the same information exists in the area of A×D in the area 702, the additional information (manufacturer ID in this case) can be certainly decoded.

Although the important information has been set to the manufacturer ID in the above embodiment, the invention is not limited to it. The user ID or the factory ID can be also used as important information.

In the above embodiment, each time the other information is added once, the important information is added twice. However, the invention is not limited to such a method but the important information can be also added a plurality of number of times such as three or more times in accordance with the importance.

Each time the other information is added once, the important information is not added a plurality of number of times but the position of the AddOn line showing the important information can be also varied in the area of the unit period (702 in FIG. 2, 1202 in FIG. 8).

Figure 10:
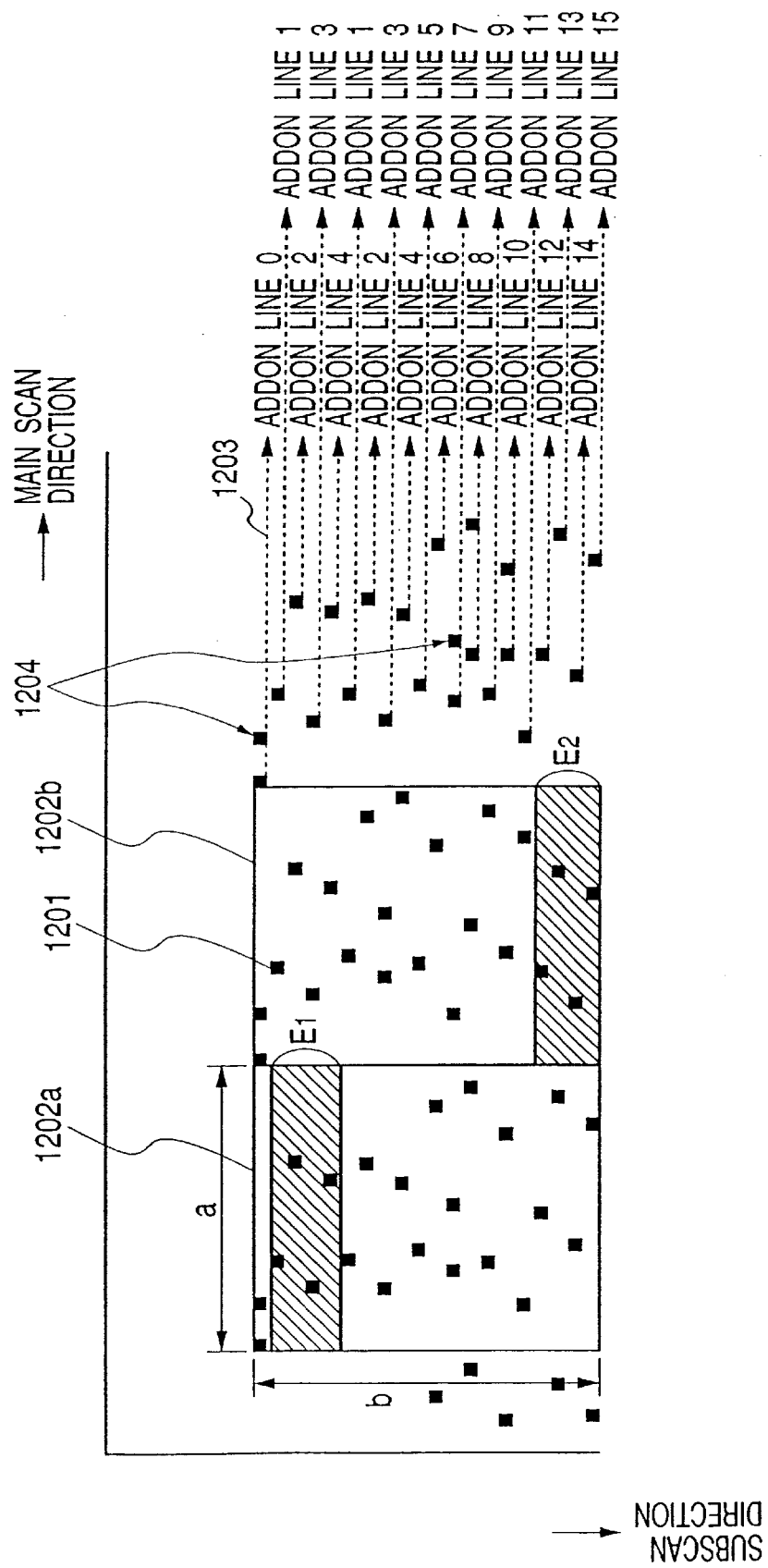
FIG. 10 is a diagram showing a state where the AddOn dots were added.

FIG. 10 is a diagram showing a state where the additional information was added by using the above method. An outline of the diagram is similar to FIG. 8. FIG. 10 differs from FIG. 8 with respect to a point that four AddOn lines to show the important information (manufacturer ID in this case) change on the area 1202. In the diagram, in an area 1202*a* at the first left upper position of the image, an area $E_1$ of the first four AddOn lines is an area showing the important information. On an area 1202*b*, an area $E_2$ of the last four AddOn lines changes to the area to indicate the important information. Subsequently, the position of the four AddOn lines to show the important information is changed like $E_3$, $E_4$, . . . .

Thus, even if there is a cause of periodic elements such as in the case where a dot image similar to the dot 1201 periodically exists in an image to which the additional information should be added, in the case where a trouble or the like in the image process always exists in the area of $E_1$ at the same period as that in the area 702, or the like, the additional information can be certainly decoded.

In the above embodiment, as for the AddOn dots, the additional information is added by the dots 404 and 405 constructed by combining the FF area and 00 area as shown in FIG. 7. However, the invention is not limited to such a method. Dots can be also formed by performing a modulation of +α to the original image with respect to the area corresponding to the FF area and by executing a modulation of −α to the area corresponding to the 00 area.

According to this-construction, since the density of the original image is substantially preserved, the deterioration in picture quality can be suppressed as much as possible.

According to the invention as described above, in the case such that the additional information is added to the input image a plurality of number of times, a situation such that the additional information to be added becomes difficult to be decoded due to causes of some periodic elements such that at least a part of the input image is periodical, a trouble or the like in the image process is periodical, or the like can be avoided. Particularly, in case of burying a plurality of kinds of additional information to the input image, the information having high significance can be decoded as much as possible.

As a second embodiment of the invention, an image processing apparatus using a color electrophotographing technique is shown. However, the invention is not limited to it but can be also applied to an image processing apparatus using a technique such as ink jet system, thermal transfer system, or the like. The invention is not limited to the apparatus invention but a method of performing the processes, which will be explained hereinlater, software to perform this method, and the like are also incorporated in the present invention.

In the embodiment, it is now assumed that the image data which is inputted is multi-value image data of M (magenta), C (cyan), Y (yellow), and K (black) each consisting of 8 bits per color and the multi-value image data is area sequentially inputted.

It is also assumed that the image processing apparatus (laser beam printer) of the embodiment has a resolution of 600 dpi and the dot pattern showing the additional information for fake tracking is added to only the plane of Y. By using this method, it is possible to construct such that the additional information is difficult to be discriminated by the human eyes as much as possible. Even a color image to which the additional information was added can be used in a manner similar to the original color image before the additional information is added. The invention is not limited to the case of adding the additional information for fake tracking. In other words, a case where the name of author who made the original image or the title or the like of the image is used as additional information is also incorporated in the invention.

Figure 11:
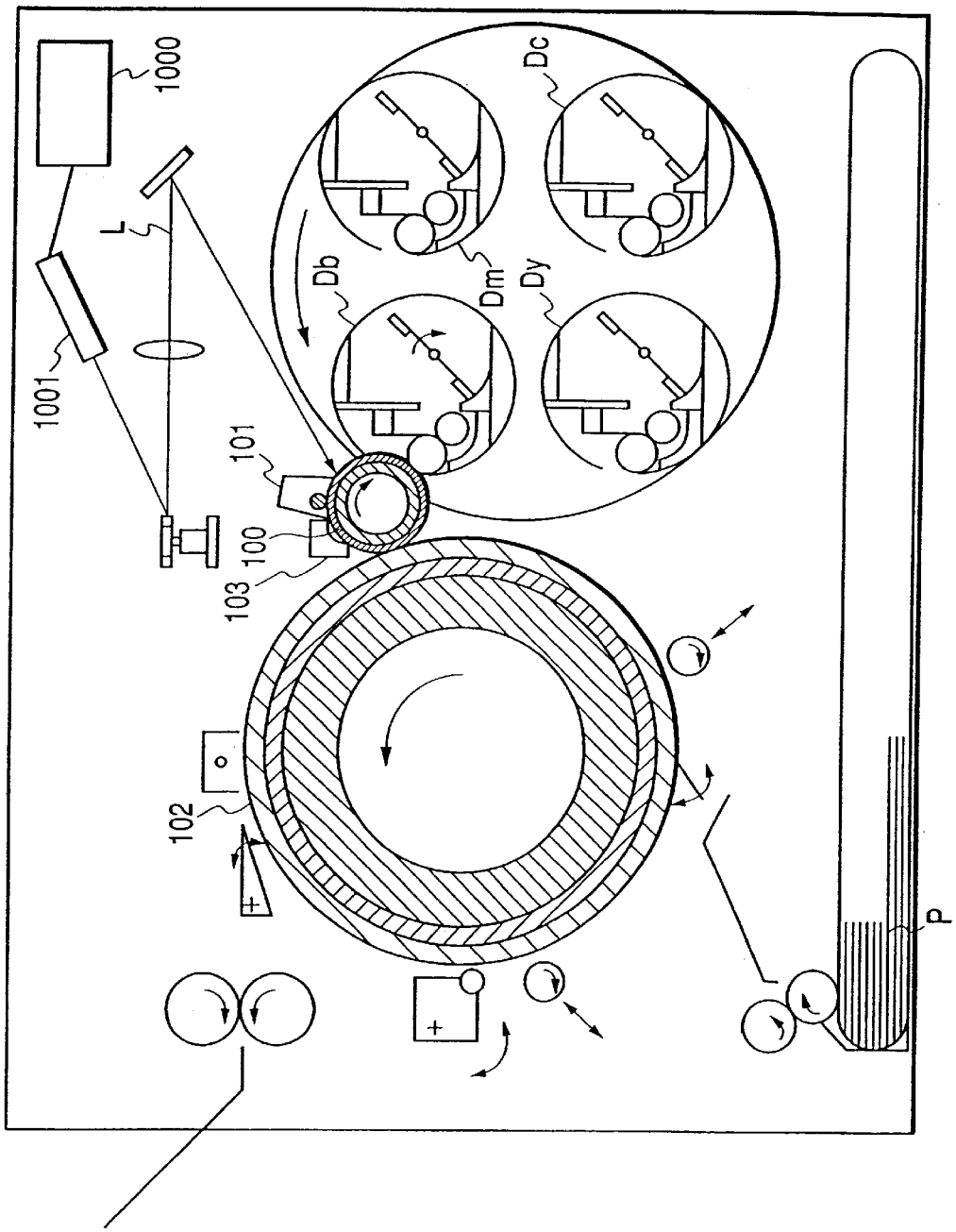
FIG. 11 is a diagram showing an example of an image processing apparatus.

FIG. 11 shows a construction of an image processing apparatus which is used in the following embodiment.

Reference numeral 1000 denotes an image processing unit. The image processing unit 1000 sequentially inputs multi-value image data of M, C, Y, and K from external equipment or another equipment in the apparatus, adds addition information, which will be explained hereinlater, to the multi-value image data, and after that, outputs the image data of each color to a laser light emitting unit 1001. The laser light emitting unit 1001 emits the laser beam L, which will be explained hereinlater, modulated in accordance with the inputted image data.

The photosensitive drum 100 is uniformly charged to a predetermined polarity by the charging device 101. For example, a first latent image of magenta is formed on the photosensitive drum 100 by the exposure by the laser beam L. In this case, a desired development bias voltage is applied to only the developing device Dm of magenta, the latent image of magenta is developed, and the first toner image of magenta is formed on the photosensitive drum 100.

On the other hand, the transfer paper P is fed at a predetermined timing. Just before the front edge of the transfer paper reaches the transfer start position, a transfer bias voltage (+1.8 kV) of a polarity (for example, plus polarity) opposite to that of the toner is applied to the transfer drum 102. The first toner image on the photosensitive drum 100 is transferred onto the transfer paper P. The transfer paper P is electrostatically adsorbed onto the surface of the transfer drum 102. After that, the residual magenta toner on the photosensitive drum 100 is removed by the cleaner 103, thereby preparing for the latent image formation and the developing step of the next color.

Subsequently, in a manner similar to the case of magenta mentioned above, the second latent image of cyan is formed onto the photosensitive drum 100 by the laser beam L. The second latent image on the photosensitive drum 100 is developed by the developing device Dc of cyan. The second toner image of cyan is formed. The second toner image of cyan is transferred onto the transfer paper P while matching to the position of the first toner image of magenta which has already been transferred to the transfer paper P. In the transfer of the toner image of the second color, just before the transfer paper reaches the transfer unit, a bias voltage of +2.1 kV is applied to the transfer drum 102.

Similarly, the third and fourth latent images of yellow and black are sequentially formed on the photosensitive drum 100 and are sequentially developed by the developing devices Dy and Db, respectively. The third and fourth toner images of yellow and black are sequentially transferred while matching to the position of the toner image which has already been transferred to the transfer paper P. Thus, a full color image in which the toner images of four colors were overlapped is formed on the transfer paper P.

Additional information for fake tracking which is added by the image processing apparatus of the embodiment will now be described.

Figure 12:
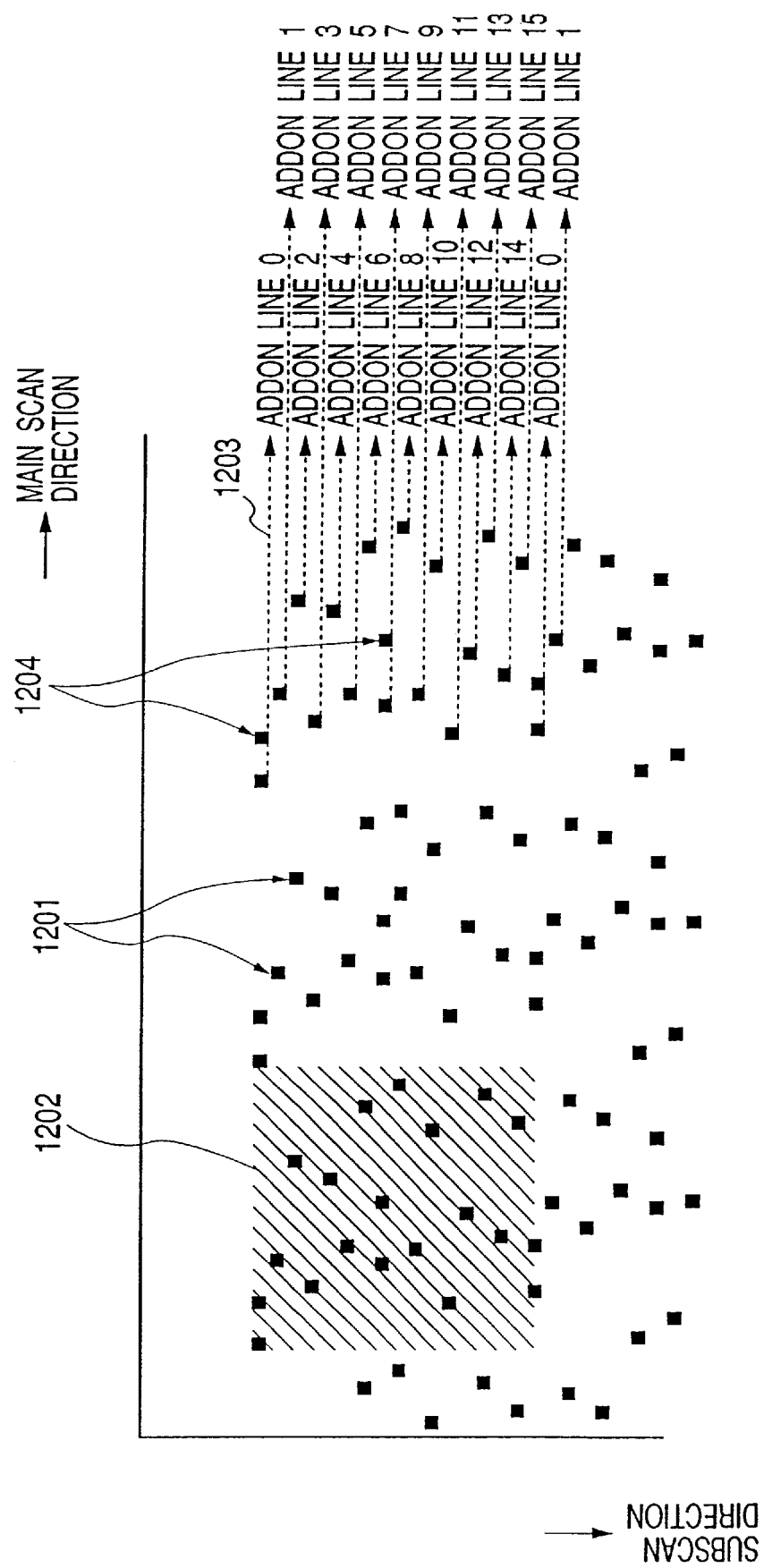
FIG. 12 is a diagram showing a state where additional information was added to an input image.

FIG. 12 shows a state where the additional information was added to the image shown by the inputted image data in the embodiment. In the embodiment as mentioned above, since the additional information is added to only the plane of Y, FIG. 12 shows the image shown by the plane of Y of the color image comprising planes of Y, M, C, and K.

Each of dots 1201 existing in FIG. 12 is a dot of a micro area constructed by a plurality of pixels. This dot is referred to as an AddOn dot hereinbelow.

In the diagram, a meshed area 1202 is a unit area showing additional information which is added to the color image (plane of yellow) in the embodiment. The unit area 1202 periodically exists in the original color image (plane of yellow). By using this method, with respect to the color image finally formed after the additional information was added, the additional information can be analyzed with reference to any one of the areas.

A plurality of lines 1203 called AddOn lines exist in the unit area 1202. In the embodiment, it is assumed that 16 lines exist in the main scan direction. It is also assumed that as for the foregoing AddOn dots, one AddOn dot is arranged on each AddOn line in the unit area 1202. As will be explained hereinlater, the additional information can show various information by the position (phase) of the AddOn dot on each AddOn line. As various information, the product name, manufacturing number, manufacturer name, and the like of the image processing apparatus can be allocated.

A reference dot 1204 to prevent that the arranging direction of the AddOn dot to show the additional information is erroneously discriminated is added in the unit area 1202. The position of the reference dot is always fixed. In the embodiment, the reference dot 1204 is added onto the 0th and 7th AddOn lines together with the AddOn dot. By using this method, the AddOn line indicative of the start of the unit area can be specified and the arranging direction of the AddOn lines 0 to 15 can be specified.

Figure 14:
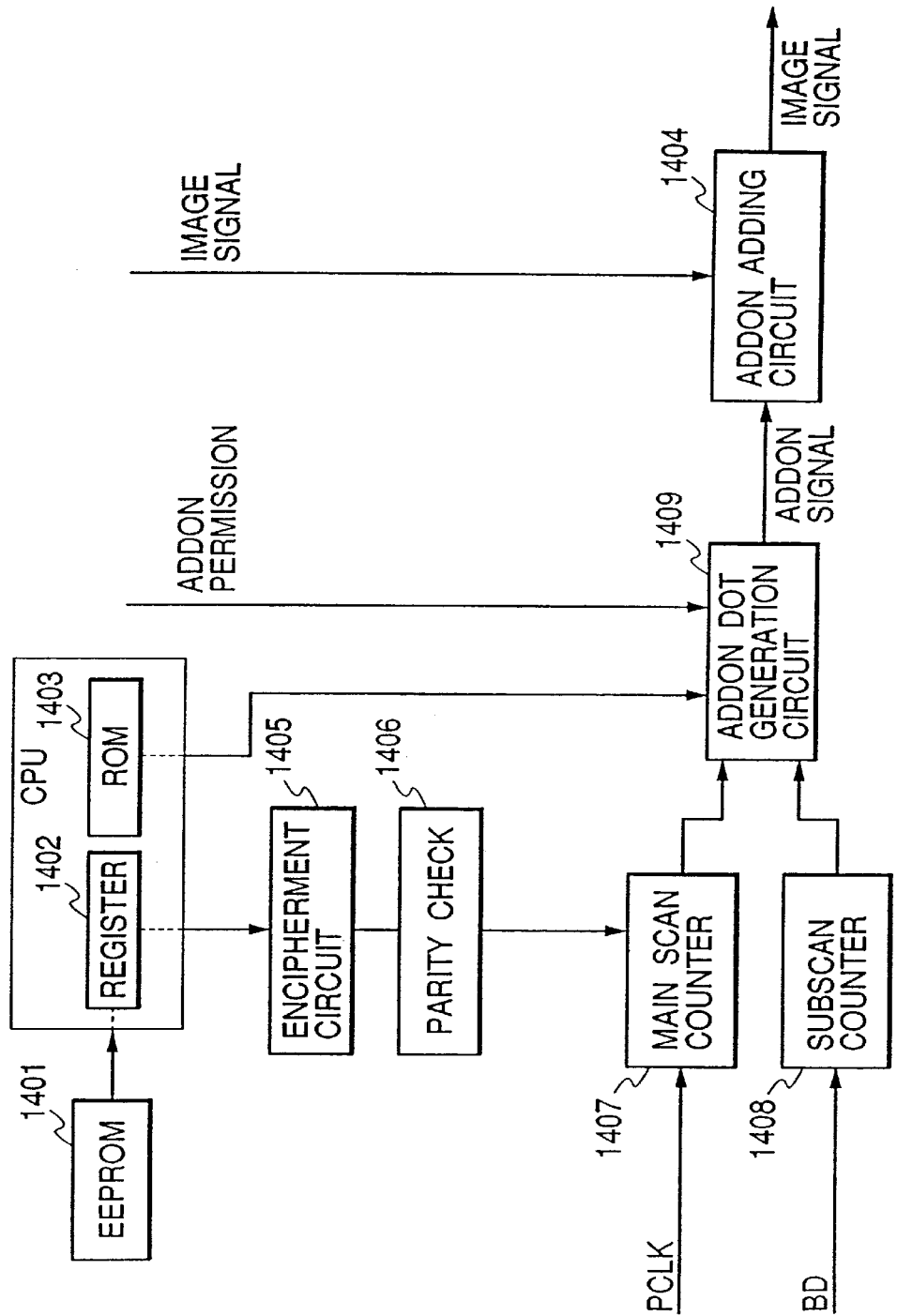
FIG. 14 is a block diagram of an AddOn dot adding processing unit.

FIG. 14 is a block diagram of an AddOn dot adding processing unit included in the image processing unit 1000 in FIG. 11. The additional information (product name of the apparatus, manufacturing number, manufacturer name, and the like) stored in an EEPROM 1401 is automatically loaded into a register 1402 in the CPU when the power source of the image processing apparatus is turned on.

FIG. 13 shows an internal construction of the register 1402. In the register 1402, codes are stored in addresses F000 to F00A. Total 12 bits comprising 8 bits of the address F000 shown by a hatched region and upper 4 bits of the address F0001 shown by a hatched region in the diagram correspond to an area only for use of the manufacturer name (manufacturer ID) mentioned above. The peculiar ID number assigned every manufacturer who manufactured the image processing apparatus is stored in this area. The codes indicative of the product name of the image processing apparatus, manufacturing number, and the like which have uniquely been determined by each manufacturer are stored in the other areas (lower 4 bits of the address F0001, and F002 to F00A).

Besides the foregoing additional information, the fixed bit in which a fixed value is stored and the parity bits for parity check are also stored in the register 1402.

When the image processing apparatus receives a command to print the color image, the foregoing additional information (product name of the apparatus, manufacturing number, manufacturer name, and the like) is inputted to an encipherment circuit 1405 and is enciphered.

The enciphered additional information is inputted to a parity check circuit 1406 and the parity and the fixed bit are checked. When an error occurs here, it is regarded that the additional information has been remodeled, thereby performing a control to stop the printing operation.

A main scan counter 1407 executes the counting operation in response to the clock signal PCLK in the main scan direction of the image data and generates an ON signal at a position where the AddOn dot should be added in accordance with a code which is loaded by the parity check 1406.

A subscan counter 1408 executes the counting operation in accordance with the clock signal BD in the subscan direction and generates an ON signal in the AddOn line.

An AddOn dot generation circuit 1409 receives the AddOn dot-shaped parameter which is stored into an ROM 1403 in the CPU, forms the AddOn dot only when all of an AddOn permission signal which is turned on only when the yellow plane of the image data is transmitted, the main scan counter 1407, and the subscan counter 1408 are ON, turns on the AddOn signal, and sends.

When the AddOn signal is OFF, an AddOn adding circuit 1404 transmits as it is to the image data which is inputted. When the AddOn signal is ON, the AddOn adding circuit 1404 converts it into the AddOn dot and sends it. Thus, the additional information (AddOn dot) is formed as shown in FIG. 12.

A method of analyzing the additional information added to the image data in the embodiment, namely, a method of showing the additional information by the AddOn dot will now be described.

Figure 15:
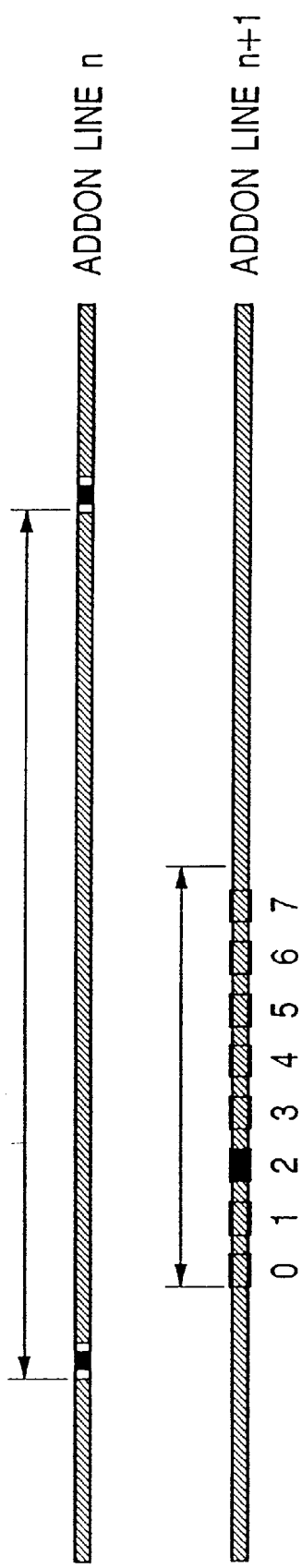
FIG. 15 is a diagram for explaining an expressing method of information by AddOn dots.

FIG. 15 enlargedly shows the n-th and (n+1)th AddOn lines in the unit area 1202 in FIG. 12. Explanation will now be made with respect to the (n+1)th AddOn line. A phase difference using the AddOn dot on the n–th AddOn line as a reference is assigned to 0 to 7 (3 bits) as shown in the diagram, thereby allowing the AddOn dot to be added to the position corresponding to the 3-bit information to be added in the (n+1)th AddOn line. Therefore, information of 3 bits can be expressed by one AddOn line (AddOn dot). Thus, since there are 16 AddOn lines in the embodiment, additional information of total 48 bits can be added.

However, the invention is not limited to this method but the additional information can be also added by another method. For example, by adding a plurality of AddOn dots onto each AddOn line, more additional information can be also added.

As for the analysis of the phase difference, for example, the color image to which the additional information was added is read by a scanner, only the image of the plane of Y (yellow) is extracted and transmitted to a host computer, and an interval between the AddOn dots is measured on a monitor of the host computer, so that the phase difference can be measured. On the basis of the measured phase difference, the code of each AddOn line is searched and the searched codes are arranged as shown in FIG. 16 and are binarized. After that, the binary codes are assigned as address information of a00 to a30 and b00 to b112.

a00 to a32 indicate the manufacturer ID (manufacturer name) and a22, a30, a31, and a32 are parity bits.

Figure 17:
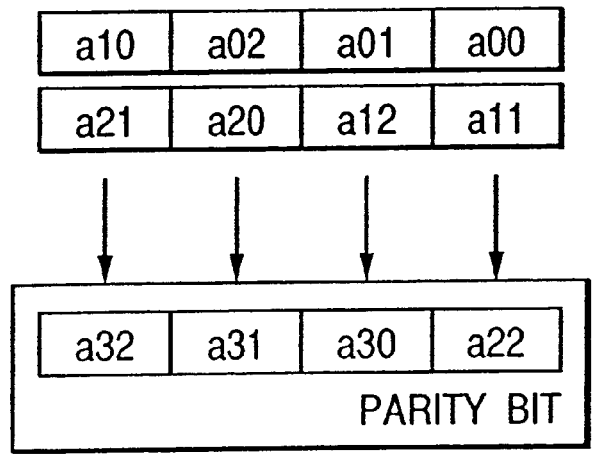
FIG. 17 is a diagram showing parity bits of a manufacturer ID.

First, when the manufacturer ID is analyzed, a00 to a32 are arranged as shown in FIG. 17 and it is confirmed that a22, a30, a31, and a32 become even parities in the arrow direction in the diagram. If an error is detected by the parity check, it is regarded that there is a reading mistake (analysis mistake) of the manufacturer ID and the operation is re-executed from the measurement.

If no error is detected by the parity check, a00 to a21 are arranged as follows, thereby obtaining the manufacturer ID.

Manufacturer, ID=(a21, a20, a12, a11, a10, a02, a01, a00)

In the example of FIG. 16, the manufacturer ID is as follows.

Manufacturer ID=(a21, a20, a12, a11, a10, a02, a01, a00)=0, 0, 1, 0, 0, 0, 1, 0(B)=34(D)

The manufacturer who manufactured the image processing apparatus which was used for the formation of the color image is analyzed by the obtained manufacturer ID.

After the manufacturer ID was analyzed, the additional information such as product name, manufacturing number, and the like can be analyzed by the method according to each manufacturer. This is because there is a possibility such that the adding method of the additional information such as product name, manufacturing number, and the like differs every manufacturer. Therefore, the parity bits are independently added to the manufacturer ID and the product name and manufacturing number, respectively.

Subsequently, with respect to b00 to b112 (including the parity bits) showing the additional information such as product name, manufacturing number, and the like, they are analyzed (parity check) independently of the manufacturer ID.

As for the additional information of b00 to b112, after the decoding of the additional information of b00 to b112 and the parity check were performed by using the method suitable for each manufacturer, the model number, apparatus number, and the like are obtained.

As mentioned above, by independently adding the parity bits to the manufacturer ID (manufacturer name) and the product name and manufacturing number (model number, apparatus number, and the like can be also used), even in case of adding the additional information of the manufacturer ID and the additional information such as product name, manufacturing number, and the like to the image by different methods, whether the various analyzed additional information is accurate or not can be certainly discriminated.

Figure 19:
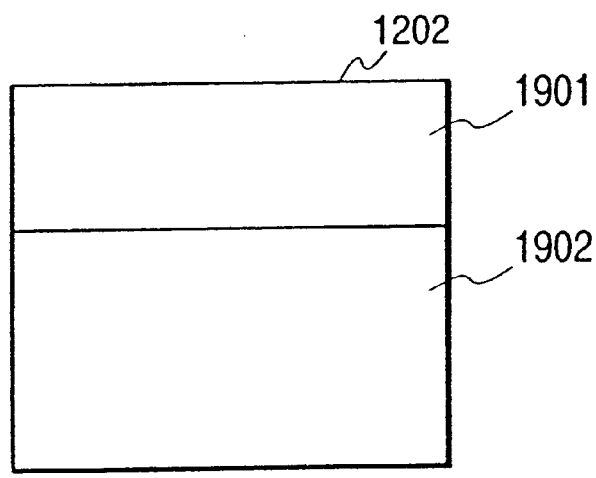
FIG. 19 is a conceptual diagram of additional information of a manufacturer ID, a product name, and a manufacturing number.

FIG. 19 shows a conceptual diagram of the additional information such as manufacturer ID, product name, and manufacturing number added in the above embodiment.

In FIG. 19, reference numeral 1202 corresponds to the unit area 1202 in FIG. 12. The manufacturer ID is added (expressed) by using the AddOn lines (AddOn lines 0 to 3) of an upper area 1901 of the unit area 1202. The product name and the manufacturing number are added (expressed) by using the AddOn lines (AddOn lines 4 to 15) in a lower area 1902 of the unit area 1202.

Figure 18:
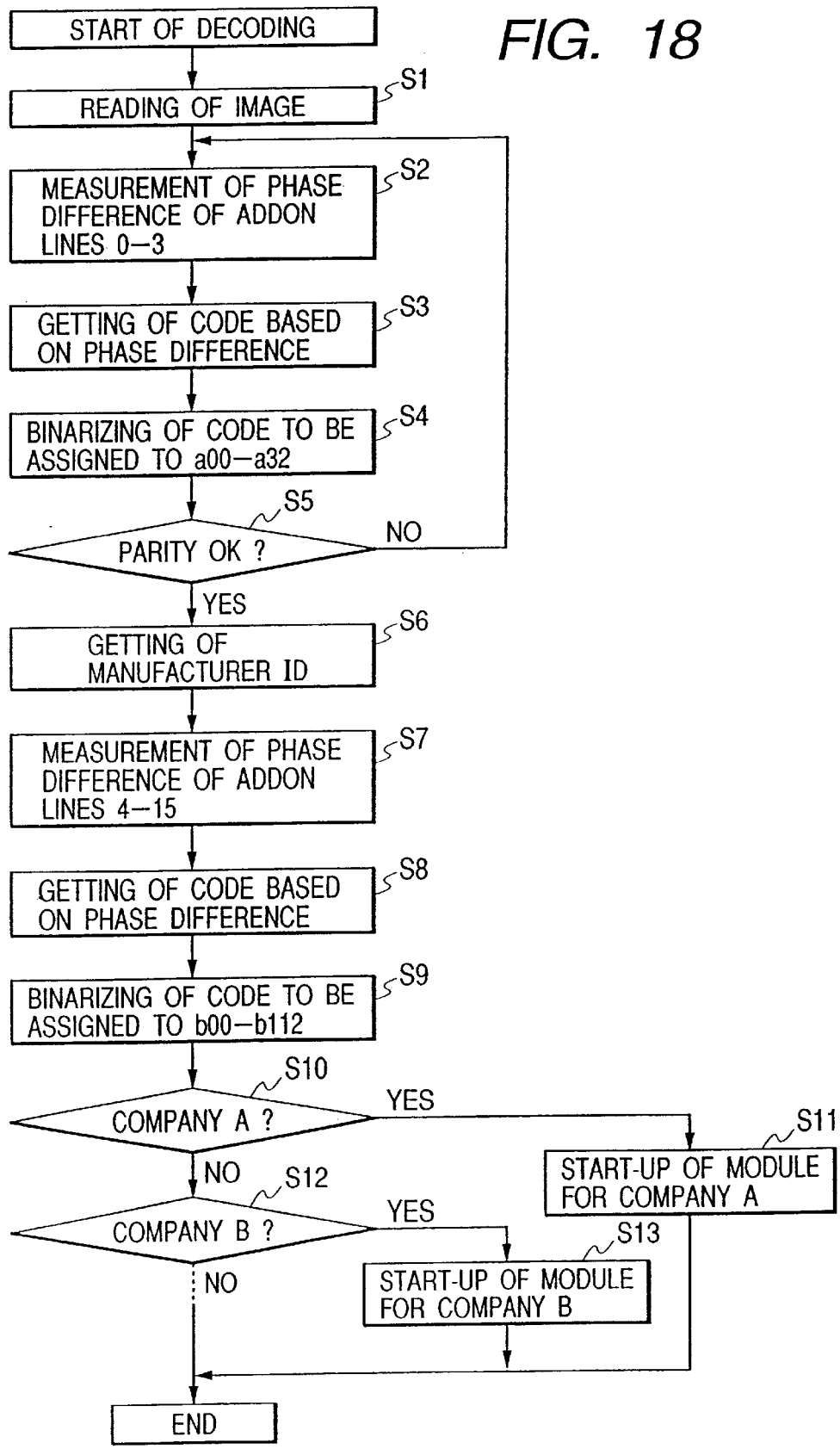
FIG. 18 is a diagram showing a procedure for decoding additional information from an image to which the additional information was added.

A procedure to decode the additional information will now be explained with reference to FIG. 18.

When the decoding is started, the color image is first read by a scanner. Since the additional information of the embodiment has been added to the yellow plane, only the yellow plane is read (step S1). Subsequently, the reference dot is detected, the head of the AddOn line and the direction of the AddOn line are recognized, and phase differences among the AddOn lines 0 to 3 (AddOn lines 15 and 0; 0 and 1; 1 and 2; and 2 and 3) are measured (step S2).

The codes of the AddOn lines 0 to 3 are obtained on the basis of the measured phase differences (step S3) and are binarized and are assigned to a00 to a32 (step S4). The parity check of FIG. 17 mentioned above is subsequently executed (step S5). If there is an error, the operation is re-executed from the measurement of the phase differences (step S2). If there is no error, the manufacturer ID is obtained (step S6).

Phase differences among the AddOn lines 4 to 15 are subsequently measured (step S7). On the basis of the measured phase differences, the codes of the AddOn lines 4 to 15 are obtained (step S8) and are binarized and are assigned to b00 to b112 (step S9).

A check is made to see if the manufacturer ID obtained in step S6 indicates company A (step S10). If it is the company A, a module for company A is activated (step S11). The module for company A rearranges b00 to b112 in accordance with the rules of company A and the parity check and the like are executed. After that, the product name, manufacturing number, and the like are obtained.

When the manufacturer ID does not indicate company A in step S10, a check is made to see if it indicates company B (step S12). If it indicates company B, a module for company B is activated (step S13). In a manner similar to step S11, the module for company B rearranges b00 to b112 in accordance with the rules of company B and the parity check and the like are executed. After that, the product name, manufacturing number, and the like are obtained.

Similarly, when the manufacturer ID does not indicate company B in step S12, the manufacturer IDs are sequentially checked only a number of times as many as the number of registered manufacturers such that company C, company D , . . . .

In the embodiment, although the number of AddOn lines to store the information of each manufacturer has been fixed to 12 AddOn lines 4 to 15, the number of AddOn lines can be also varied every manufacturer.

In the embodiment, as for the parity bits, parity bits such that an error detection can be merely performed are added to the manufacturer ID corresponding to the area 1901 in FIG. 19 and the product name and manufacturing number corresponding to the area 1902 in FIG. 19, respectively. However, the invention is not limited to this method. An error correction code such that an error of the additional information can be corrected can be also provided for each of the additional information corresponding to the areas 1901 and 1902.

Thus, even if there is an error in the analysis of the additional information, the operation to again read the phase differences can be omitted.

Further, in the case where it is considered that significance of the additional information (manufacturer ID) in the area 1901 is higher than that of the additional information (product name, manufacturing number, and the like) corresponding to the area 1902 such as a case where there is a possibility such that unless the additional information of the area 1901 can be analyzed, the area 1902 cannot be analyzed or the like, it is also possible to give an error correction code of a high error correcting ability to the additional information of the area 1901 and to give an error correction code of a lower error correcting ability than that in the area 1901 to the area 1902.

By using this method, the important portion of the additional information can be certainly analyzed. Specifically speaking, since the manufacturer ID can be certainly analyzed, a method for subsequently analyzing the product name, manufacturing number, and the like can be determined.

Although the embodiment has been described above on the assumption that the method of adding the manufacturer ID into the area 1901 and the method of adding the product name, manufacturing number, and the like into the area 1902 are the same method, the invention is not limited to this construction but also includes a case where the adding methods of the additional information to the areas 1901 and 1902 are different.

That is, in the embodiment, since the manufacturer ID which can specify the adding method of the area 1902 is added to the area 1901 different from the area 1902, there is an effect such that even if the adding methods of the additional information of the areas 1901 and 1902 are different, by sequentially analyzing in accordance with the order of the areas 1901 and 1902 as mentioned above, all of the additional information can be sufficiently decoded.

In the above embodiment, although the additional information has been added by the AddOn dot in which the original image is merely modulated to the highest density, the invention is not limited to such a construction. For example, even if one AddOn dot is constructed by combining an area to add +α to the density of the original image and an area to subtract a from the density of the original image, the additional information can be sufficiently analyzed. In this case, since the density of the original image is preserved, the picture quality that is further higher than that in the foregoing embodiment can be preferably held. One AddOn dot can be also constructed by combining an area to modulate the density of the original image to the highest density and an area to modulate it to the lowest density. By using this method, the AddOn dot can be easily decoded irrespective of the density of the original image.

According to the invention as described above, in the case where predetermined additional information is added to the input image by one of a plurality of methods which are generally considered so that it is difficult to discriminate by the human eyes, another information which can specify the method of adding the predetermined additional information is added so that it is difficult to discriminate by the human eyes. Therefore, the additional information can be efficiently decoded from the image to which the predetermined additional information was added.

The first additional information including the error correction code having the first error correcting ability is added to the input image so that it is difficult to discriminate by the human eyes and the second additional information including the error correction code having the second error correcting ability different from the first error correcting ability is added so that it is difficult to discriminate by the human eyes. Therefore, when the importance of a plurality of additional information which is added to the image so that it is difficult to discriminate by the human eyes is different, the additional information having the high importance can be certainly decoded.

The invention is not limited to each of the above embodiments but can be applied as a part of a system constructed by a plurality of equipment (for example, host computer, interface equipment, reader, printer, and the like) or can be also applied to a part of an apparatus comprising one equipment (for instance, copying apparatus or facsimile apparatus).

The invention is not limited to only the apparatus and method for realizing the above embodiments. The invention also incorporates a case where program codes of software to realize the embodiment are supplied to a computer (CPU, MPU) in the system or apparatus and the computer of the system or apparatus makes the various devices operative in accordance with the program codes, thereby realizing the embodiment.

In this case, the program codes themselves of the software realize the function of the embodiment. The program codes themselves and means for supplying the program codes to the computer, specifically speaking, a storage medium in which the program codes have been stored are also incorporated in the scope of the invention.

As a storage medium to store the program codes as mentioned above, for example, it is possible to use a floppy disk, a hard disk, an optical disk, a magnetooptic disk, a CD-ROM, a magnetic tape, a non-volatile memory card, an ROM, or the like.

Not only in the case where the computer controls various devices in accordance with only the supplied program codes, thereby realizing the function of the embodiment but also in the case where the program codes cooperate together with the OS (Operating System) which operates on the computer or another application software or the like, the above program codes are also incorporated in the scope of the invention.

Further, the invention also incorporates a case where the supplied program codes are stored into a memory provided for a function expansion board of the computer or a function expanding unit connected to the computer and, after that, a CPU or the like provided for the function expansion board or function expanding unit executes a part or all of the actual processes on the basis of an instruction of the program codes and the embodiment is realized by the processes.

The present invention is not limited to the foregoing embodiments but many modifications and variations are possible within the spirit and scope of the appended claims of the invention.

What is claimed is:

1. An image processing apparatus comprising:
   an input unit, said input unit inputting an image to which first additional information is added by a first addition method so that it is difficult to discriminate by human eyes and to which second additional information is added by a second addition method so that it is difficult to discriminate by human eyes; and
   an extraction unit, said extraction unit extracting from the image the first additional information according to a first extraction method corresponding to the first addition method and extracting from the image the second additional information according to a second extraction method corresponding to the second addition method,
   wherein the second extraction method is specified by the first additional information.

2. An apparatus according to claim 1, wherein the first extraction method and the second extraction method are different.

3. An apparatus according to claim 1, wherein the first extraction method and the second extraction method are the same.

4. An apparatus according to claim 1, wherein the first additional information is a manufacturer ID of said image processing apparatus.

5. An apparatus according to claim 1, wherein the first additional information is an equipment number or product name of said image processing apparatus.

6. An apparatus according to claim 1, wherein the first additional information is a pattern composed of plural dots.

7. An apparatus according to claim 1, wherein the second additional information is a pattern composed of plural dots.

8. An apparatus according to claim 1, wherein the first additional information is periodically added to the input image.

9. An image processing method comprising the steps of:
   inputting an image to which first additional information is added by a first addition method so that it is difficult to discriminate by human eyes and to which second additional information is added by a second addition method so that it is difficult to discriminate by human eyes; and
   extracting from the image the first additional information according to a first extraction method corresponding to the first addition method and extracting from the image the second additional information according to a second extraction method corresponding to the second addition method,
   wherein the second extraction method is specified by the first additional information.

10. A computer-executable image processing program comprising program codes for controlling an image processing apparatus to perform the steps of:
   inputting an image to which first additional information is added by a first addition method so that it is difficult to discriminate by human eyes and to which second additional information is added by a second addition method so that it is difficult to discriminate by human eyes; and extracting from the image the first additional information according to a first extraction method corresponding to the first addition method and extracting from the image the second additional information according to a second extraction method corresponding to the second addition method, wherein the second extraction method is specified by the first additional information.

* * * * *

UNITED STATES PATENT AND TRADEMARK OFFICE
CERTIFICATE OF CORRECTION

PATENT NO. : 6,822,761 B2
DATED : November 23, 2004
INVENTOR(S) : Eihiro Sakaki et al.

It is certified that error appears in the above-identified patent and that said Letters Patent is hereby corrected as shown below:

Title page,
Item [57], ABSTRACT,
Line 4, "was" should read -- were --.

Column 1,
Line 17, "be being" should be -- be --.
Line 40, "differs" should read -- differs for --.

Column 6,
Line 23, "16" should not be in bold.

Column 9,
Line 26, "this-construction" should read -- this construction --.

Column 13,
Line 6, "differs" should read -- differs for --.

Column 14,
Line 1, "Ain" should read -- A in --.
Line 16, "12" should not be in bold.
Line 17, "varied" should read -- varied for --.

Column 15,
Line 3, "subtract a" should read -- subtract $\alpha$ --.

Signed and Sealed this

Third Day of May, 2005

JON W. DUDAS
*Director of the United States Patent and Trademark Office*